UNITED STATES PATENT OFFICE.

ERNEST DEACON BELL, OF LONDON, ENGLAND, ASSIGNOR TO JOHN ABLETT, OF LONDON, ENGLAND.

FOOD PREPARATION AND METHOD OF MAKING SAME.

SPECIFICATION forming part of Letters Patent No. 685,665, dated October 29, 1901.

Application filed January 25, 1901. Serial No. 44,713. (No specimens.)

*To all whom it may concern:*

Be it known that I, ERNEST DEACON BELL, a subject of the King of Great Britain, residing in London, England, have made new and useful Improvements in Alimentary Preparations; and I hereby affirm that the following is a complete and precise description of the invention.

The object of my invention is to produce from nuts and nut-like substances, such as peanuts, a nutritious and richly-flavored preparation which shall also be more easily digestible than nuts and nut preparations usually are.

To achieve my purpose, I take nuts or nut-like substances rich in oil, such as peanuts, blanch them to remove their skins, and then reduce them to the condition of a soft homogeneous mass by passing them through rollers, pounding in a mortar, grinding, or by any other suitable device. In some cases the nuts, especially if they are peanuts, may be roasted or boiled with advantage before crushing; but this preliminary treatment is not essential. I next take any good rich cheese, finely grated or otherwise finely comminuted or reduced to a soft homogeneous mass by passing through rollers, and add it to the nuts in such proportion that the cheese shall usually amount to from fifty to one hundred per cent. the weight of nuts employed. To this nut-cheese mixture water or milk, preferably milk, is added to the extent of about one and a half times the weight of the nut-cheese mixture employed. The liquid used—water or milk—must have alkali, preferably the carbonate or bicarbonate of potash or soda, dissolved in it to the extent of not more than one and a half per cent. the weight of cheese employed. The alkali may advantageously be dissolved in the liquid before the liquid is combined with the nut-cheese mixture; but this is simply for convenience, as the alkali could be added after. The combination of the nut-cheese mixture with the alkalized liquid should be of the consistence of a thin paste. The alkalized nut-cheese paste is then cooked over a slow fire or in a hot-water bath for from an hour to an hour and a half, when the preparation will be complete. The consistence of the finished preparation will be about that of a fairly soft cheese; but it could be made softer still by increasing the proportion of liquid used to the mixture of nuts and cheese. The preparation can be greatly enriched in flavor by the addition of eggs and suitable condiments. If eggs are used, they should be well beaten up and thoroughly incorporated with the food after the completion of the cookery just described. They may be added in various proportions, but preferably to the extent of about fifty per cent. the weight of cheese employed. The preparation should then be cooked a second time for from fifteen to thirty minutes over a quicker fire than the first, when the process will be complete. The advantages in this mode of preparation are that the alkali converts the insoluble proteids of the nuts into the digestible form of alkali albumen and at the same time aids in emulsifying the oil, which is thus rendered more amenable to the digestive fluids. It also develops a flavor superior to the crude flavor of nuts, and the preparation is greatly enriched by the presence of alkalized cheese, the characteristically fine flavor of which is eminently calculated to blend well with the flavor of alkalized nuts.

The proportions of cheese and nuts and of the nut-cheese mixture to liquid admit of some variation.

I claim—

1. A preparation of nuts in which the albumen has been converted into the soluble form of alkali albumen flavored with alkalized cheese, and composed of crushed nuts, an alkali, a suitable liquid and cheese, substantially as described and for the purposes set forth.

2. A preparation of nuts in which the albumen has been converted into the soluble form of alkali albumen flavored with alkalized cheese, and composed of crushed nuts, an alkali, a suitable liquid, cheese and eggs, substantially as described and for the purposes set forth.

3. The process hereinbefore described consisting of the following steps: first, the blanching of the nuts; second, the crushing of the nuts to a homogeneous mass; third, the addition of comminuted cheese to the nuts; fourth, the combination of the nut-cheese mixture with about one and a half times its weight of milk or water containing alkali to the extent of about one and a half per cent. the weight of cheese employed; fifth, the cooking of the alkalized nut-cheese paste for from an hour to an hour and a half.

4. The process hereinbefore described consisting of the following steps: first, the blanching of the nuts; second, the crushing of the nuts to a homogeneous mass; third, the addition of the comminuted cheese to the nuts; fourth, the combination of the nut-cheese mixture with about one and a half times its weight of milk or water containing alkali to the extent of about one and a half per cent. the weight of cheese employed; fifth, the cooking of the alkalized nut-cheese paste for from one hour to an hour and a half; sixth, removing from the fire and adding egg well beaten up; seventh, cooking a second time for from fifteen to thirty minutes over a quicker fire than the first.

In witness whereof I have signed this specification in presence of two witnesses.

ERNEST DEACON BELL.

Witnesses:
   E. COURTNEY WALKER,
   J. PHILLIPS CRAWLEY.